(12) United States Patent
Karam et al.

(10) Patent No.: US 9,557,415 B2
(45) Date of Patent: Jan. 31, 2017

(54) ENHANCED IMAGING SYSTEM (71) Applicants: Mostafa A. Karam, Moorpark, CA (US); Raj K. Shori, North Hills, CA (US); Douglas Lee Sego, Azusa, CA (US); Lyle K. Bidler, II, Placentia, CA (US); A. Douglas Meyer, Woodland Hills, CA (US)

(72) Inventors: Mostafa A. Karam, Moorpark, CA (US); Raj K. Shori, North Hills, CA (US); Douglas Lee Sego, Azusa, CA (US); Lyle K. Bidler, II, Placentia, CA (US); A. Douglas Meyer, Woodland Hills, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 242 days.

(21) Appl. No.: 14/159,199

(22) Filed: Jan. 20, 2014

(65) Prior Publication Data
US 2015/0276927 A1  Oct. 1, 2015

(51) Int. Cl.
*G01S 13/86* (2006.01)
*G01S 13/89* (2006.01)
(Continued)

(52) U.S. Cl.
CPC .............. *G01S 13/89* (2013.01); *G01S 13/865* (2013.01); *G01S 17/89* (2013.01)

(58) Field of Classification Search
CPC ........ G01S 13/86; G01S 13/865; G01S 13/88; G01S 13/89; G01S 17/88; G01S 17/89; G01S 7/02; G01S 7/04; G01S 7/40; G01S 7/4004; G01S 7/74021; G01S 13/867; G01S 13/93; G01S 13/931; G01S 17/02; G01S 17/023; G06K 9/20; G06K 9/32;G06K 9/3233; G06K 9/3241; H04N 5/222; H04N 5/262; H04N 5/2624; H04N 5/14; H04N 5/21; H04N 5/217; G01V 3/15; G01V 3/17
(Continued)

(56) References Cited

U.S. PATENT DOCUMENTS 3,351,936 A * 11/1967 Feder ................. G01V 3/17
324/330
4,122,521 A * 10/1978 Rick ................... G01S 7/04
342/52
(Continued)

FOREIGN PATENT DOCUMENTS

EP  1 288 888 A2  3/2003
EP  1 672 390 A1  6/2006
(Continued)

OTHER PUBLICATIONS

Entry for the word "response" in the on-line Merriam-Webster Dictionary at www.merriam-webster.com, retrieved Nov. 2, 2015.*
(Continued)

*Primary Examiner* — Bernarr Gregory
(74) *Attorney, Agent, or Firm* — Tarolli, Sundheim, Covell & Tummino LLP (57) ABSTRACT

One embodiment describes an imaging system. The system includes a first imaging system configured to provide first signals to a target area and to receive first response signals. The system also includes a second imaging system configured to provide second signals to the target area and to receive second response signals. The first and second signals can have separate frequency bands. The system further includes a processor configured to correct the first response signals based on the second response signals, and to generate an image based on the corrected first response signals.

20 Claims, 10 Drawing Sheets

(51) Int. Cl.
*G01S 17/89* (2006.01)
*G01S 13/00* (2006.01)
*G01S 17/00* (2006.01)

(58) Field of Classification Search
USPC ....... 342/52–55, 61–66, 175, 176, 179, 195,
342/165, 173, 174; 382/100, 103, 276,
382/286, 291; 702/127, 179, 181, 189
See application file for complete search history.

(56) References Cited

U.S. PATENT DOCUMENTS

| | | | |
|---|---|---|---|
| 5,966,678 A | 10/1999 | Lam | |
| 6,909,997 B2* | 6/2005 | Chen | G06K 9/3241 |
| | | | 702/189 |
| 6,999,896 B2* | 2/2006 | Takahashi | G01S 13/865 |
| | | | 702/181 |
| 7,176,830 B2* | 2/2007 | Horibe | G01S 17/023 |
| | | | 342/179 |
| 7,274,830 B2* | 9/2007 | Bacarella | H04N 5/2624 |
| | | | 348/E5.053 |
| 7,616,817 B2 | 11/2009 | Hilde | |
| 8,009,081 B2* | 8/2011 | Hong | G01S 13/89 |
| | | | 342/52 |
| 8,102,423 B2 | 1/2012 | Cheng | |
| 8,466,827 B2* | 6/2013 | Nanami | 342/52 |
| 8,604,966 B1* | 12/2013 | Luk-Paszyc | G01S 7/4021 |
| | | | 342/165 |
| 9,041,588 B2* | 5/2015 | Yasugi | G01S 13/867 |
| | | | 342/52 |
| 2004/0178945 A1* | 9/2004 | Buchanan | G01S 13/931 |
| | | | 342/54 |
| 2007/0136224 A1 | 6/2007 | Aboutalib | |
| 2007/0165967 A1* | 7/2007 | Ando | G01S 17/023 |
| | | | 382/291 |
| 2008/0273210 A1 | 11/2008 | Hilde | |
| 2010/0013615 A1 | 1/2010 | Hebert et al. | |
| 2010/0175573 A1 | 7/2010 | Cornett et al. | |
| 2010/0202657 A1 | 8/2010 | Salgian et al. | |
| 2010/0282894 A1 | 11/2010 | Guertin et al. | |
| 2013/0300875 A1* | 11/2013 | Strandemar | H04N 5/217 |
| | | | 348/164 |

FOREIGN PATENT DOCUMENTS

WO    WO 94/19771    9/1994
WO    WO 2006/137829 A2    12/2006

OTHER PUBLICATIONS

EP Search Report 2015 for corresponding EP 15000140.2-1812 dated July 1; Completed Jun. 23, 2015 by Mark Beer of Munich.

* cited by examiner

ENHANCED IMAGING SYSTEM

TECHNICAL FIELD

The present invention relates generally to an enhanced imaging system.

BACKGROUND

A radar system, such as a frequency-modulated continuous wave (FMCW) radar system operating at millimeter wave (MMW) frequencies, can be utilized to image a target area, such as to provide object detection within the target area. As an example, the radar system can send an electromagnetic signal to the target area. If the object is present within the target area, the object can reflect a portion of the transmitted electromagnetic signal back to the radar system. The radar system can construct an image based on the reflected signals, such as to detect an object in the constructed image.

SUMMARY

One embodiment describes an imaging system. The system includes a first imaging system configured to provide first signals to a target area and to receive first response signals. The system also includes a second imaging system configured to provide second signals to the target area and to receive second response signals. The first and second signals can have separate frequency bands. The system further includes a processor configured to correct the first response signals based on at least a portion of the second response signals, and to generate an image based on the corrected first response signals.

Another embodiment includes a non-transitory computer-readable storage medium storing instructions executable by an associated processor to perform a method for imaging. The method includes correcting radar response signals that are received from a radar system corresponding to backscattered radar signals reflected from a target area. The radar response signals being corrected based on at least a portion of lidar response signals that are received from a lidar system corresponding to backscattered lidar signals reflected from the target area. The method also includes generating a corrected radar image based on the corrected radar response signals and generating a lidar image based on the lidar response signals. The method further includes fusing the corrected radar image with the lidar image to generate a fused image.

A further embodiment includes a lidar/radar device. The lidar/radar device includes a housing that houses a radar device and a lidar device separated by a distance. The radar device is configured to generate radar response signals from a target area, and the lidar device is configured to generate lidar response signals from the target area. The lidar/radar device also includes a processor that is configured to correct the radar response signals based on at least a portion of the lidar response signals and the distance and generate a corrected radar image based on the corrected radar response signals.

DETAILED DESCRIPTION

The present invention relates generally to an enhanced imaging system for imaging a target area (e.g., the area of interest) that is scanned by a first imaging system with a second imaging system that takes a redundant image of the target area. As an example, the first imaging system can be a lidar imaging system and the second imaging system can be a radar imaging system. Although a typical radar system often can image objects with a high degree of accuracy when the target area is located within a short range from the radar system and/or without the presence of obscuring cover, the imaging capability of the typical radar system can suffer from degradation both at longer ranges and in the presence of an obscuring cover. The addition of the lidar system can enhance imaging capability of the radar system both at longer ranges and in the presence of obscuring cover by taking the redundant image of the target area. The distortion caused by longer range imaging can be improved by correcting the backscattering coefficients of the radar response based on slant range vectors derived from the lidar response and the distortion caused by the obscuring cover can be improved by fusing the corrected radar image with the lidar image.

As used herein, the term "radar system" generally refers to a type of imaging system that uses electromagnetic waves (e.g., radio waves, microwaves, and the like) to image the target area based on a backscattered signal. Generally, as used herein, the "backscattered signal" refers to the portion of the electromagnetic waves that is reflected back to the radar system from the target area and received by the radar system (e.g., by a radar antenna of the radar system). The backscattered signal can be used in imaging so that the radar system can determine the range, altitude, direction, speed, etc. of features of the target area. The terms "radar antenna" and/or "radar device" may be used synonymously with "radar system" herein because the radar system generally employs a radar antenna and/or a radar element to transmit the electromagnetic waves and/or to receive the backscattered signal. The systems and methods described herein use a lidar response to correct the degraded backscattered signal. As used herein, the terms "response", "response signal", and "response signals" can refer to reflected (or backscattered) signals. For example, a "radar response signal" corresponds to the reflected or backscattered radar signal used for radar imaging. Similarly, the "lidar response signal" corresponds to the reflected or backscattered lidar signal used for lidar imaging.

At longer ranges and/or in the presence of obscuring cover (e.g., due to foliage, smoke, camouflage, etc.), the backscattered signal can be degraded such that the imaging capability of a typical radar system suffers. The lidar system (also referred to as the "ladar system") does not suffer from such problems. The term "lidar" (a combination of the terms "light" and "radar") and "ladar" (a combination of the terms "laser" and "radar") both generally refer to a remote sensing technology that measures distance by illuminating a target area with a laser (generally with a shorter wavelength than the electromagnetic waves of radar) and analyzing the reflected light to obtain the slant ranges of target elements and to create an image of the same target area.

Figure 1:
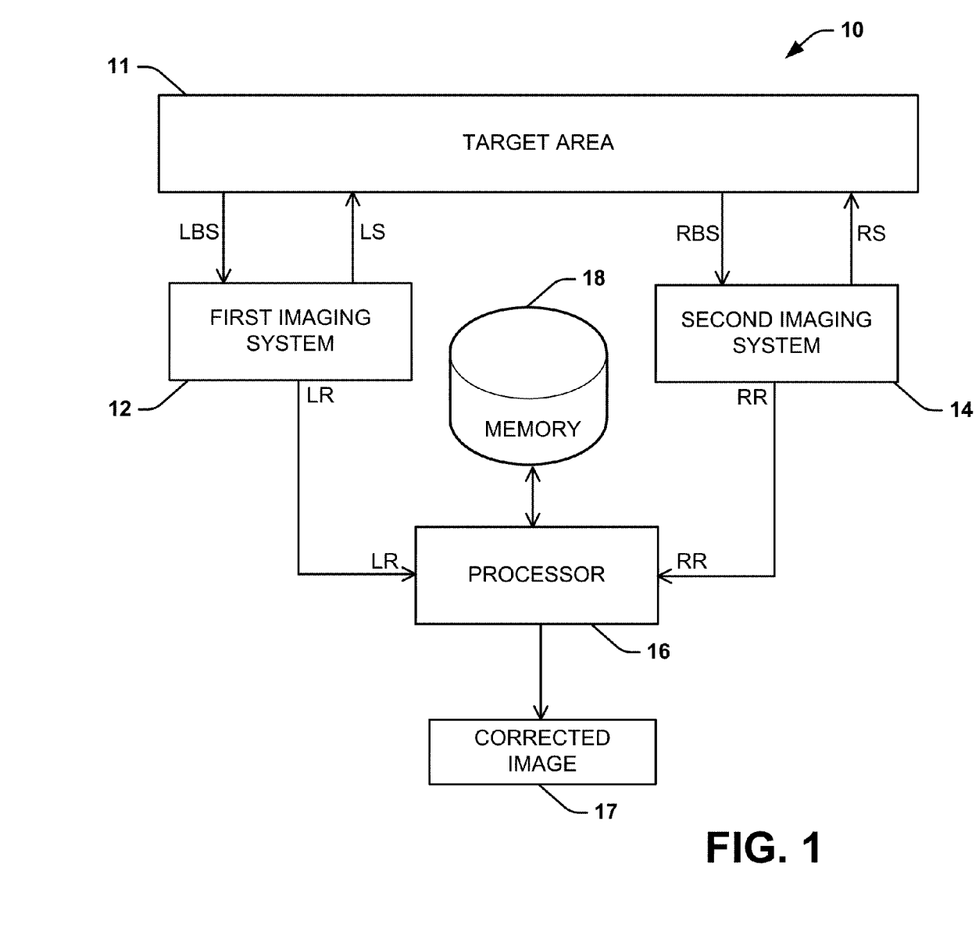
FIG. 1 illustrates an example of an imaging system.

An example of an imaging system 10 that employs a first imaging system 12 and second imaging system 14 to achieve a greater imaging capability for target objects within a target area 11 compared to a typical imaging system is depicted in FIG. 1. The first and second imaging systems 12 and 14 can have associated different frequency bands, such as having different imaging capabilities. As an example, the first imaging system 12 can be a lidar imaging system and the second imaging system 14 can be a radar imaging system. The imaging system 10 can provide enhanced imaging capability over a typical imaging system, such as a typical radar system, to provide a resultant image that has more resolution and more clearly visible features, such as to more accurately detect and identify objects, especially when its respective target area is at longer ranges from the typical imaging system and/or when the respective target area is in the presence of obscuring cover.

The second imaging system 14 can be a type of an imaging system that sends a first transmitted signal (RS) of a first frequency band of electromagnetic waves (e.g., radio waves, microwaves, millimeter waves, and the like) to image a target area 11 based on a first backscattered signal (RBS) reflected by the target area back to the second imaging system 14. As an example, the first transmitted signal RS can be a transmitted radar signal, and the first backscattered signal RBS can be a backscattered radar signal. The first backscattered signal RBS is generally a portion of the first transmitted signal RS that is reflected back to the second imaging system 14 by the target object. One non-limiting example of a type of second imaging system 14 is a frequency-modulated continuous wave (FMCW) radar system that operates at a millimeter wave (MMW) frequency. The first imaging system 12 can send a second transmitted signal (LS) of a second frequency band of electromagnetic waves (e.g., of a shorter wavelength than the electromagnetic wave used in the first transmitted signal RS of second imaging system 14, such as laser light) to the same target area 11 to create a redundant image of the same target area 11 based on a backscattered signal (LBS) reflected by the target object back to the first imaging system 12.

In addition to the first imaging system 12 and the second imaging system 14, the imaging system 10 can also include at least a processor 16 and a memory 18. The processor 16 can include, for example, a real-time processor, a signal processor, a single-board computer, or any other type of processor that can facilitate execution of instructions for imaging the target area 11. The memory 18 (also referred to as a "memory," a "non-transitory computer readable device," and/or a "non-transitory non-transitory computer-readable storage medium") can be any non-transitory medium that can store the instructions for execution by the processor 16. According to an aspect, the processor 16 and the memory 18 can be included in a single device (e.g., a computing device). In another aspect, the processor 16 and the memory 18 can be separate devices. The processor 16, for example, can be housed within the same assembly as the second imaging system 14 and the first imaging system 12, housed within a box adjacent to the second imaging system 14 and the first imaging system 12, housed within a box separate from the second imaging system 14 and the first imaging system 12, or associated with a display controller, graphical user interface, or the like.

The processor 16 and/or the memory 18 can be located in a position that facilitates communication with the second imaging system 14 and the first imaging system 12 so the processor 16 can receive a second response signal (RR) from the second imaging system 14 and a first response signal (LR) from the first imaging system 12. The second response signal RR can include at least a portion of the first backscattered signal RBS, and the first response signal LR can include at least a portion of the backscattered signal LBS. The processor 16 can execute instructions stored in the memory 18 to correct the second response signal RR (e.g., backscattering coefficients of the second response signal RR) according to a portion of the first response signal LR (e.g., slant range vectors with corresponding magnitude values and direction values) to from a corrected second response signal. The processor 16 can create a corrected image 17 based on the corrected second response signal. The corrected image 17 can illustrate the target object more clearly than an image created via the uncorrected second response signal RR.

In an example, the portion of the first response signal LR that the processor 16 uses to correct the second response signal RR includes the slant range vectors of the first response signal LR. The slant range vectors generally correspond to scattering centers of a footprint (corresponding to a radial extent of the target area 11 to be illuminated by the second imaging system 14 and an azimuthal extent of the target area 11 of the second imaging system 14 that contribute to the second response signal RR. To achieve the slant vectors, the first imaging system 12 can be configured to scan the same target area 11 as the second imaging system 14 with a LS that includes laser light of a shorter wavelength than the electromagnetic wave of the first transmitted signal RS used by the second imaging system 14. According to an example, to overcome atmospheric attenuation the laser light employed by the first imaging system 12 can have a wavelength from about 1.3 µm to about 1.35 µm. However, it will be understood that the first imaging system 12 can utilize any wavelength of laser light shorter than the wavelength of the electromagnetic wave used by the second imaging system 14.

The first imaging system 12 can be configured with a geometrical configuration (e.g., size and/or shape) that is equivalent or similar to a geometrical configuration of a the second imaging system 14 (e.g., the geometrical configuration of an antenna, an aperture of a radar antenna, or the like) to ensure that the same target area 11 is imaged by both the first imaging system 12 and the second imaging system 14. In an example, the first imaging system 12 can include a plurality of elements (e.g., a lidar element array, a plurality of scanning mirrors, or a different configuration of the plurality of elements) that are arranged in a geometric configuration equivalent to a geometric configuration of one or more elements (e.g., a radar antenna or an aperture of the radar antenna) of the second imaging system 14. In other words, the phase centers of the elements within the first imaging system 12 can be arranged such that at least a portion of the reflected laser beams can be mapped into the antenna footprint by the processor 16.

The first imaging system 12 and the second imaging system 14 can be separated by a predetermined distance (d) measured from an axial center of second imaging system 14 and an axial center of the first imaging system 12. The predetermined distance (d) is related to the lag-time ($\tau$) for the processor 16 to map the first response signal LR into the second response signal RR. For example, the predetermined distance can be used to determine the lag-time ($\tau$) in cases where the imaging system 10 is moving to image the target area 11. In cases where the imaging system 10 is moving, the distance (d) can be measured in a down-track direction along a direction of travel of the imaging system 10 in space relative to the target area 11. In the case where the first imaging system 12 has an equivalent geometric configuration to the second imaging system 14, the lag-time ($\tau$) can be expressed as:

$$\tau = \frac{d}{v},\qquad \text{Eq. 1}$$

where v corresponds to the speed that the imaging system 10 travels along the down-track direction. The predetermined distance (d) can be chosen to determine the lag-time according to Eq. 1.

Figure 2:
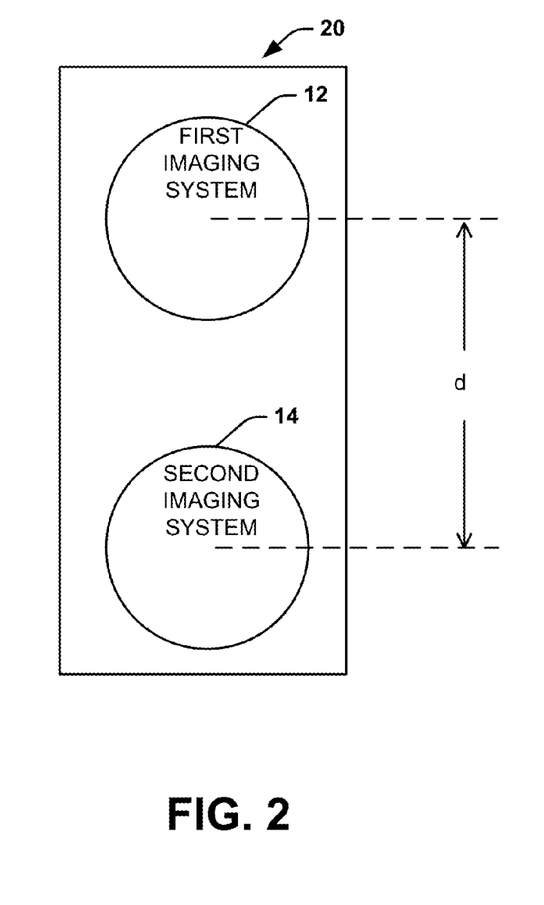
FIG. 2 depicts a side view of an example of a geometric configuration of an example device including the imaging system.
Figure 3:
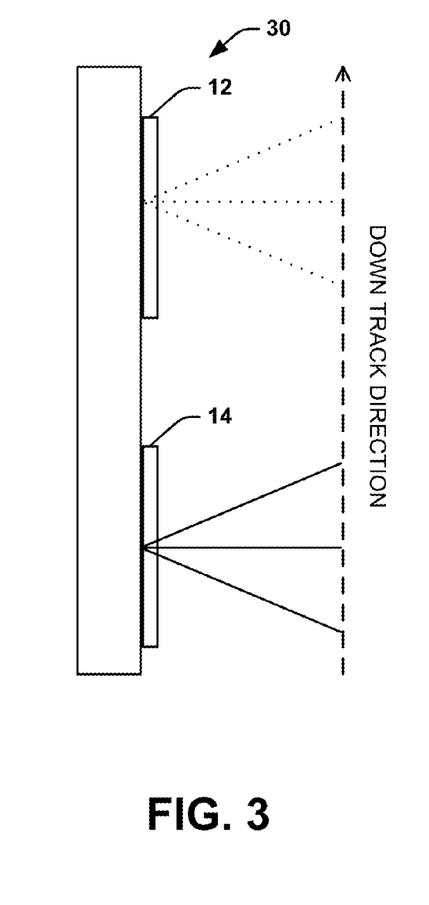
FIG. 3 depicts a top view of the example of the geometric configuration of the example device.

As illustrated in an example shown in the side view 20 of FIG. 2 and the top view 30 of FIG. 3, the imaging system 10 can be included within a single device with the first imaging system 12 and the second imaging system 14 housed within a single housing. In an example embodiment, the imaging system 10 embodied in the single device, as illustrated in FIGS. 2 and 3, can be a light-weight compact system (e.g., the light-weight compact system can meet the requirements of a combat imaging mission). However, the first imaging system 12, the second imaging system 14, the processor 16, and the memory 18 do not need to be embodied within a single device. Within the imaging system 10, the first imaging system 12 and the second imaging system 14 can be separated by a predetermined distance (d) selected such that the lag-time of the processor 16 can be determined. As shown in the top view 30 of FIG. 3, the distance (d) can be measured in the down-track direction along the direction of motion of the imaging system 10. As an example, the predetermined distance (d) can be measured from an axial center of the second imaging system 14 and an axial center of the first imaging system 12, such that that each of the axial centers move collinearly along the down-track direction as the imaging system 10 moves. It will be understood that the first imaging system 12 and the second imaging system 14 can be in a number of different configurations within the housing. The configuration as illustrated in FIGS. 2 and 3 with the first imaging system 12 configured to image the target area 11 before the second imaging system 14 is not meant to be limiting. As an example, the positions of the first imaging system 12 and the second imaging system 14 can be switched, such that the second imaging system 14 can image the target area 11 before the first imaging system 12.

Figure 4:
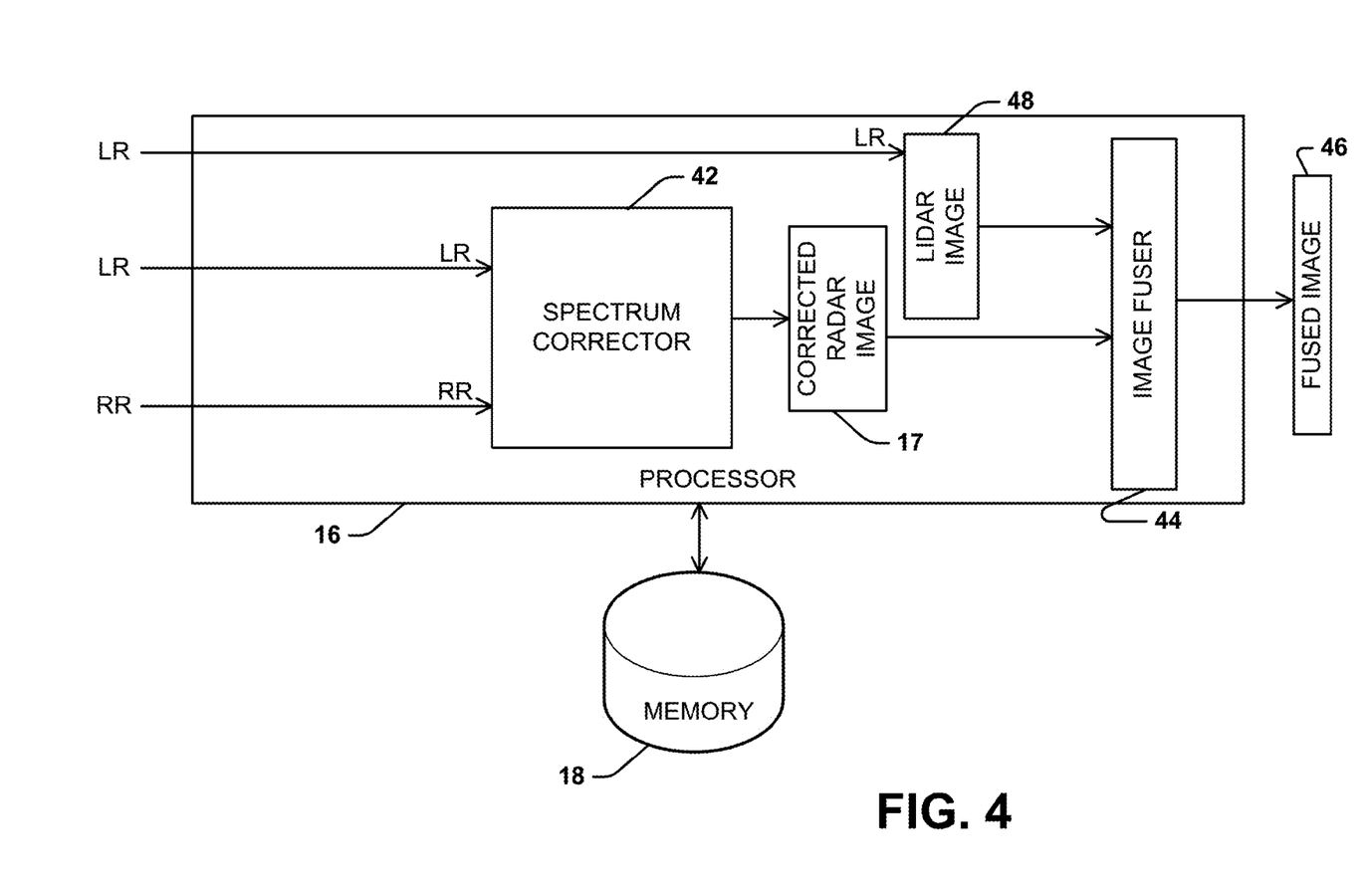
FIG. 4 illustrates an example of processor that can be used by the imaging system.

FIG. 4 illustrates an example of processor that can be used by the imaging system 10. In the example of FIG. 4, the first imaging system 12 corresponds to a lidar system that provides lidar response signals LR and the second imaging system 14 corresponds to a radar system that provides radar response signals RR The processor can receive the lidar response signal LR from the first imaging system 12 and the radar response signal RR from the second imaging system 14 (the lidar response signal LR and the radar response signal RR can both correspond to the same target area). The lidar response signal LR and the radar response signal RR are transmitted to a spectrum corrector 42 that corrects the radar response signal RR based on the lidar response signal LR. The spectrum corrector 42 generates a corrected image 17 based on the corrected RR. The processor 16 also generates a lidar image 48 based on the lidar response signal LR in parallel with the generation of the corrected image 17. The image fuser 44 creates a fused image 46 by fusing the corrected image 17 with the lidar image 48. Both the corrected image 17 and the fused image 46 exhibit an improved (e.g., clearer) imaging capability for a target object within the target area than an image created based on a typical radar response signal.

Figure 5:
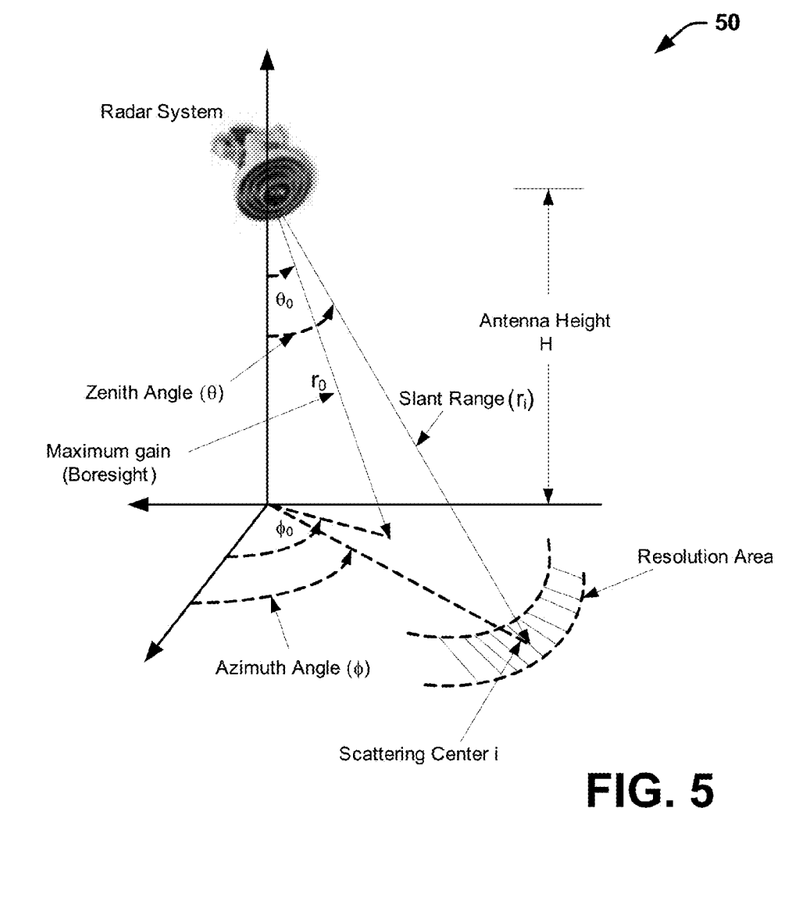
FIG. 5 depicts an example geometry of a radar system and an associated footprint.

In an example, the spectrum corrector 42 of the processor 16 can correct the backscattering coefficient values ($\tilde{\sigma}(i)$) of a post-mixer power spectrum (P(f)) of the radar response signal RR based on slant range vectors (($r_i$)) of the lidar response signal LR. The spectrum corrector 42 can determine the post-mixer power spectrum (P(f)) of the radar response signal RR by applying a spectral transform (e.g., fast Fourier transform, wavelet transform, etc.) to the radar response signal RR. The post-mixer power spectrum (P(f)) contains sources for degradation of the radar response signal RR signal (e.g., the gain of the second imaging system 14, the areas of the resolution cell associated with different slant ranges, and a variation of slant ranges across the antenna footprint) and can be expressed as:

$$P(f) = Q \sum_i \left(\frac{\sin[\psi_i(f)]}{\psi_i(f)}\right)^2 \frac{(\tilde{G}(r_i))^2 \tilde{\sigma}(r_i)}{r_i^4} \Delta A_i, \qquad \text{Eq. 2}$$

where Q represents lumped losses and/or gains to the radar response signal RR due to the transmission between the second imaging system 14 and the processor 16; $\tilde{G}(r_i)$ represents the antenna gain contributing to the post mixer power spectrum; $\Delta A_i$ represents the area of the resolution cell; and $\psi_i(f)$ is a function of the slant range $r_i$ and a time window over which the post-mixer power spectrum is calculated. The function $\psi_i(f)$ can be expressed as:

$$\psi_i(f) = 2\pi(f_i - f)T_o, \qquad \text{Eq. 3}$$

where $2T_o$ represents the time window over which the spectrum is calculated, f represents the backscattered signal spectrum frequency, and $f_i$ is the frequency representing the slant range $r_i$ of a scattering center i. The slant range $r_i$ represents slant range for each scattering center of the radar response signal RR can be expressed as:

$$r_i = \frac{H}{\cos\theta}, \qquad \text{Eq. 4}$$

where $\theta$ is the zenith observation angle and H is the antenna height H, as shown in FIG. 5. The antenna gain $\tilde{G}(r_i)$ contributing to the post-mixer spectrum associated with the range can be expressed as:

$$\tilde{G}(r_i) = \frac{1}{\phi_2 - \phi_1} \int_{\phi_1}^{\phi_2} \tilde{G}(r_i, \phi) d\phi, \quad \text{Eq. 5}$$

where $\phi_1$ and $\phi_2$ correspond to the azimuth angles.

The spectrum corrector 42 can correct the post-mixer power spectrum (P(f)) and determine corrected backscattering coefficient values $(\tilde{\sigma}(i)^{corrected})$ corresponding to scattering centers of the radar footprint of the second imaging system 14 from the corrected post-mixer spectrum. Based on the corrected backscattering coefficient values $(\tilde{\sigma}(i)^{corrected})$, the spectrum corrector 42 can form the corrected image 17. The spectrum corrector 42 can obtain the corrected backscattering coefficient values $(\tilde{\sigma}(i)^{corrected})$ by multiplying the post-mixer spectrum (P(f)) by a correction factor $\Im(r_i)$, which can be expressed as:

$$\Im(rLR_i) = \frac{r_i^4}{(G(r_i))^2 \Delta A_i}, \quad \text{Eq. 6}$$

where the slant range vectors $(r_i)$ of Eq. 6 are the slant range vectors that the spectrum corrector 42 extracts from the lidar response signal LR.

Accordingly, the spectrum corrector 42 can map the slant range vectors $(r_i)$ from the lidar response signal LR into the post-mixer spectrum (P(f)) of the radar response signal RR, determine the correction factor $(\Im(r_i))$ associated with each of the slant range vectors $(r_i)$, and correct the power-mixer power spectrum (P(f)) based on the correction factors $(\Im(r_i))$. Accordingly, the spectrum corrector 42 can generate the corrected image 17 based on the corrected backscattering coefficient values $(\tilde{\sigma}(i)^{corrected})$ corresponding to the slant range vectors $(r_i)$ of the lidar response signal LR. The corrected image 17 can be used to identify the target object within the image. For example, the corrected image 17 can be used to identify the type of target object and, thereby, reduce false alarm rates.

Figure 6:
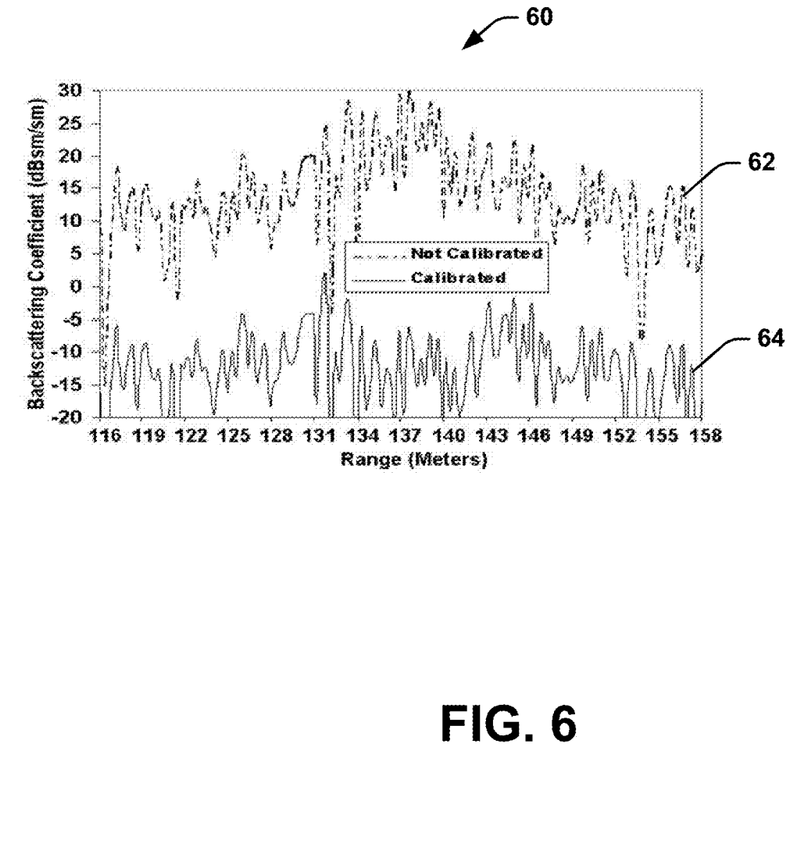
FIG. 6 illustrates non-corrected and corrected backscattering coefficients acquired from a clear road by a frequency modulated continuous wave (FMCW) radar with a carrier frequency of 35 GHz.
Figure 7:
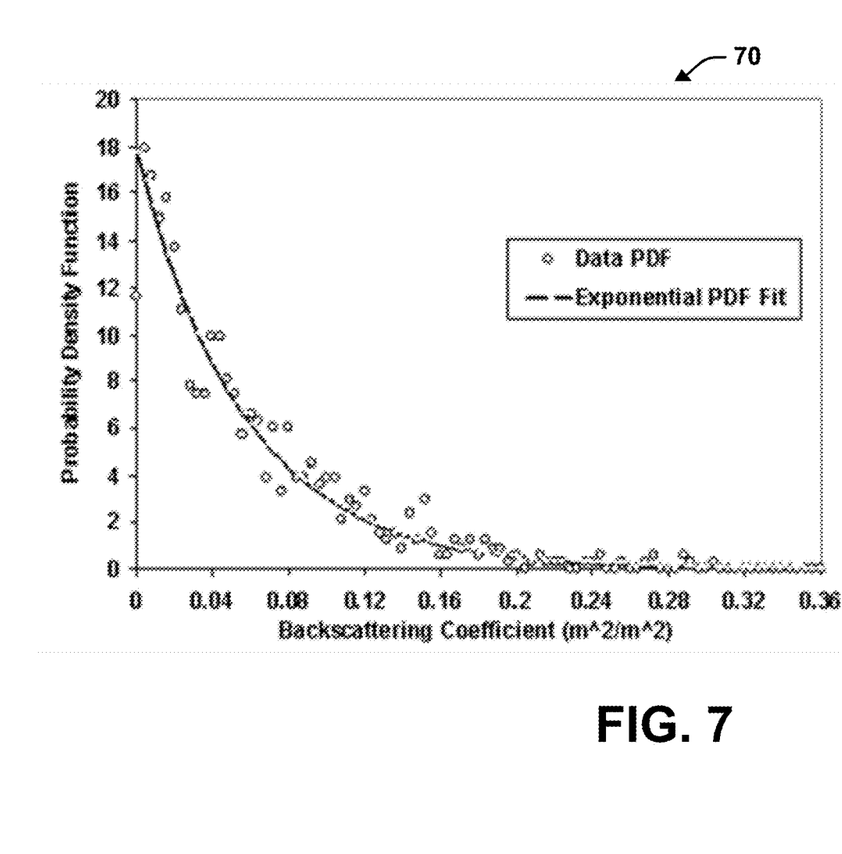
FIG. 7 illustrates the probability density function of corrected backscattering coefficients acquired from the clear road by a FMCW radar with a carrier frequency of 35 GHz.

An example plot 60 of the backscattering coefficients that can be extracted from the post-mixer power spectrum of a frequency modulated continuous wave (FMCW) radar system operating with a carrier frequency of 35 GHz by the spectrum corrector 42 versus distance across a clear road is demonstrated in FIG. 6. Two types of backscattered values are depicted in FIG. 6: non-corrected values 62 and corrected values 64. The peaks of the non-corrected values 62 can correspond to the antenna boresight, which is demonstrated as occurring at a slant range of approximately 137 m. The higher peaks of the corrected values 64 can correspond to the sides of the road at approximately 131 m and approximately 145 m, rather than to the antenna boresight, while the lower peaks of the corrected values 64 can correspond to the surface of the road. FIG. 7 is a plot 70 illustrating, as an example, that the statistical behavior of the corrected backscattered coefficients 64 can be represented by an exponential probability density function similar to respective measured counterparts in the open literature.

Referring again to FIG. 4, the processor 16 can also include an image fuser 44 that can fuse the corrected image 17 with the lidar image 48 formed based on the lidar response signal LR to form a fused image 46. The fused image 46 can penetrate an obscuring cover because the first imaging system 12 uses a shorter wavelength that can penetrate gaps in the obscuring cover that cannot be penetrated by the second imaging system 14, which has longer wavelength. Accordingly, the fused image 46 can exhibit penetration capabilities that cannot be achieved by a radar image constructed from a radar response signal of a typical radar system.

Figure 8:
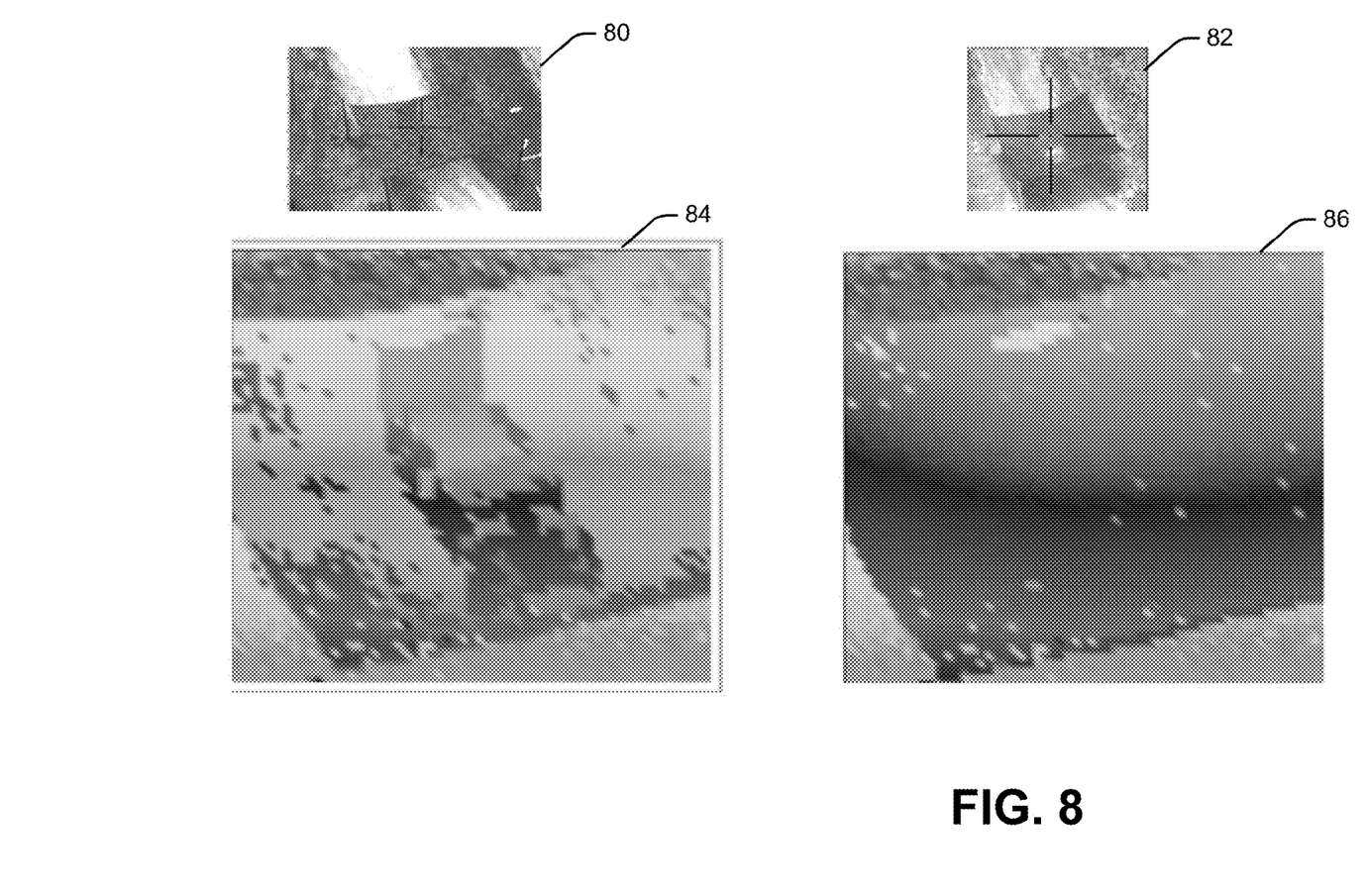
FIG. 8 depicts a laser image of a target under coverage of a net.
Figure 9:
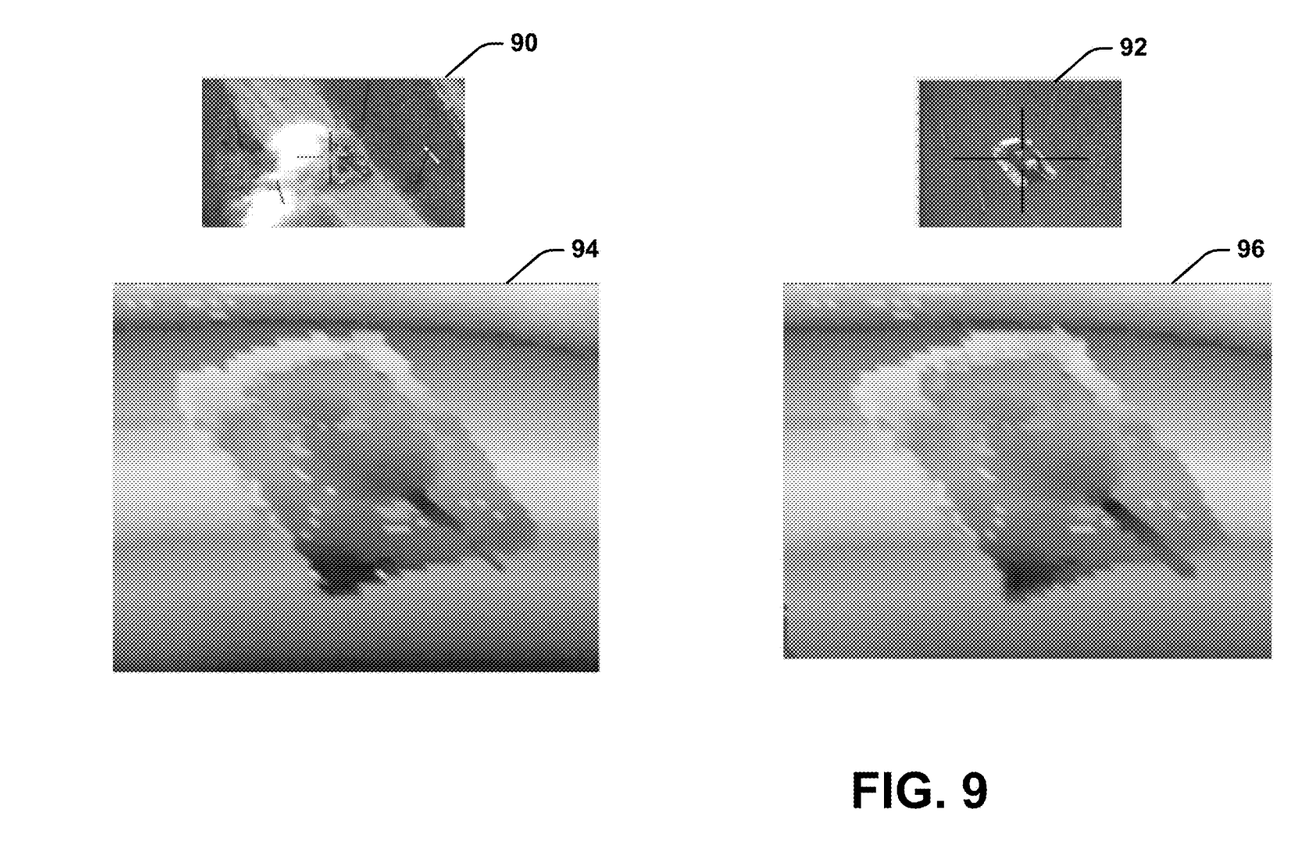
FIG. 9 depicts a laser image of a target under coverage of a layer of fog-oil smoke.
Figure 10:
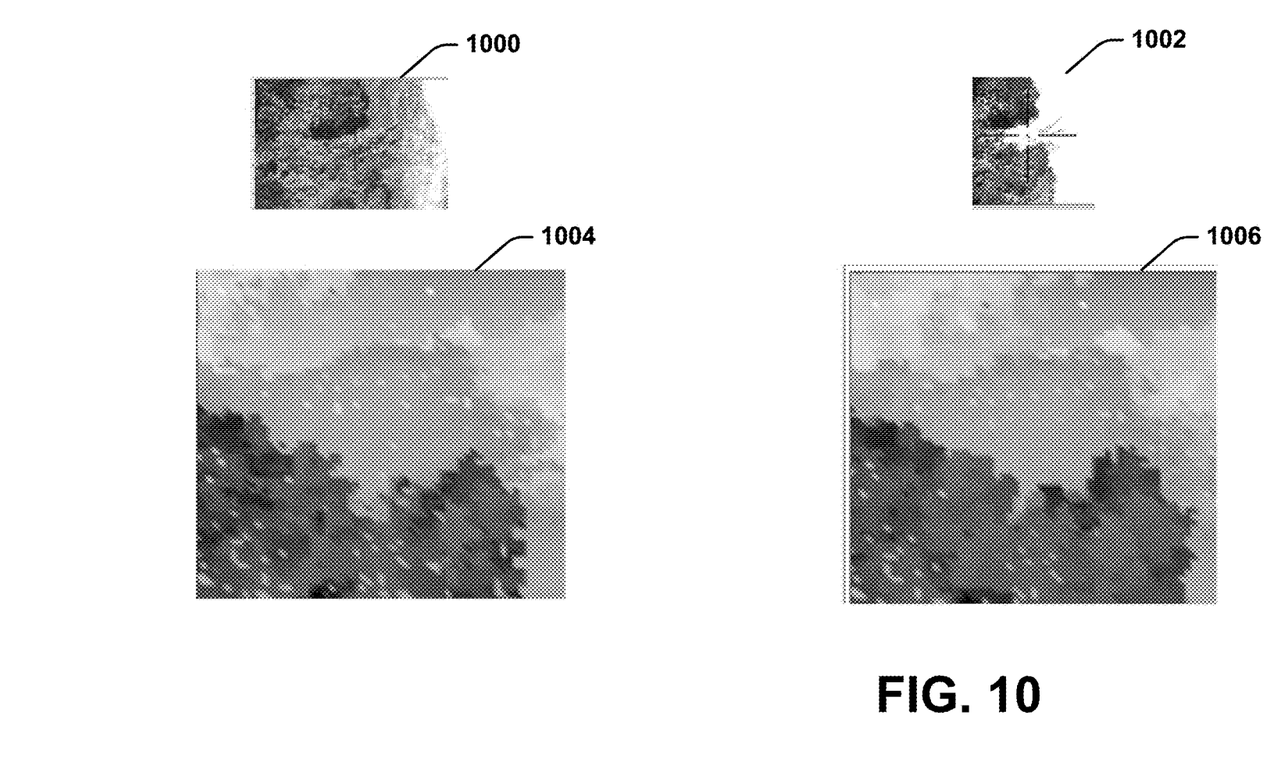
FIG. 10 depicts a laser image of a target in a tree line under coverage of foliage.

FIGS. 8-10 show three-dimensional images that illustrate the penetration capability of lidar imaging systems. Each of FIGS. 8-10 depicts images acquired by a micro-laser lidar system operating at a wavelength of approximately 1.06 microns and using two rotating mirrors for scanning the targets: one mirror for horizontal scan, and another mirror for vertical scan. The three dimensional images are: an image of a target under camouflage net (FIG. 8), an image of a target under layer of fog-oil-smoke (FIG. 9), and an image of a target in tree line with foliage (FIG. 10). The three laser images 84, 94, 1004 verify the capabilities of lidar signals in penetrating different covers, including: net, smoke, and treeline, that could not be penetrated by MMW FMCW radar frequencies. Accordingly, fusing ladar images with MMW FMCW radar images will provide penetration capabilities that could not be gained by the radar images alone.

The image 82 of FIG. 8 shows a target under cover of a camouflage net, while in the image 84 of FIG. 8, the target is clearly visible, which verifies the capabilities of the lidar system of penetrating gaps within the camouflage net. As for FIG. 9 where the target is obscured by a layer of fog-oil-smoke, there is no degradation in the target images due to smoke presence, which proves the lidar capabilities in penetrating smoke. In case of tree line of foliage depicted in FIG. 10, the foliage reduces the laser image quality; however, the images of FIG. 10 show the lidar capabilities for penetrating gaps within foliage.

The processor 16 of FIG. 4 can optionally include one or more components that can contribute to further image processing to further enhance the imaging capabilities. For example, the processor 16 can include an object detector that can detect an object present in the target area 11 (and optionally identify the object) based on the fused image 46 or the corrected image 17.

Figure 11:
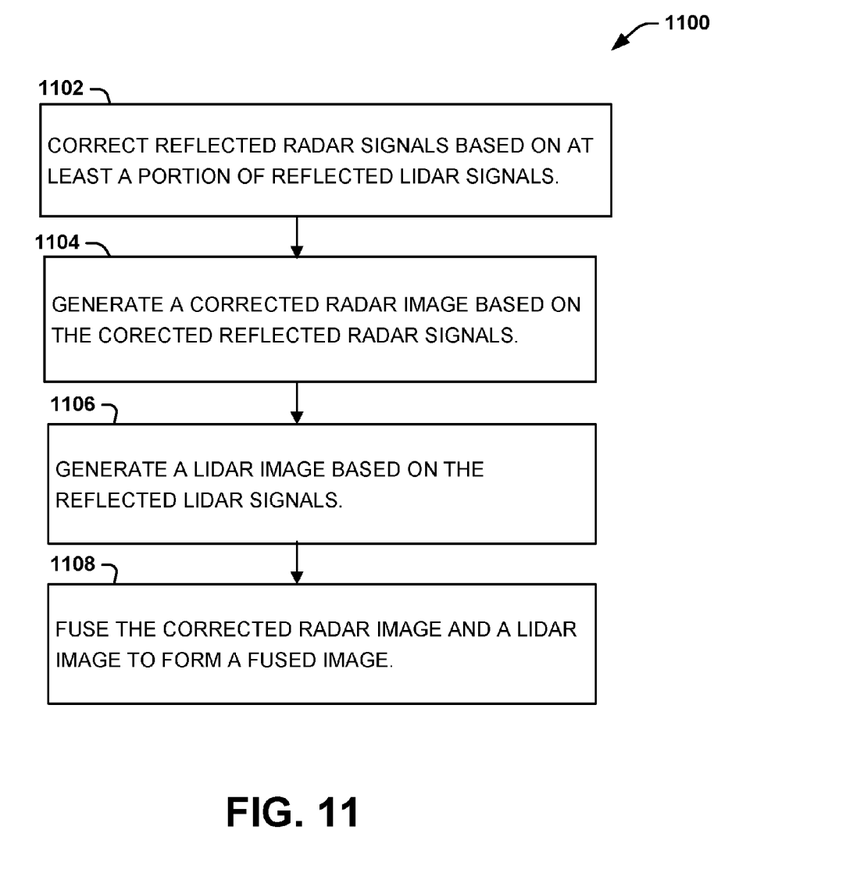
FIG. 11 illustrates an example of a method for enhanced imaging.

In view of the foregoing structural and functional features described above, a method 1100 in accordance with various aspects of the present invention will be better appreciated with reference to FIG. 11. While, for purposes of simplicity of explanation, the method 1100 of FIG. 11 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a method in accordance with an aspect of the present invention. It will be appreciated that some or all of each of these methods can be implemented as machine-readable instructions on a non-transitory computer readable medium (e.g., memory 18).

FIG. 11 illustrates an example of a method 1100 for imaging (e.g., via the second imaging system 14 and the first imaging system 12). At element 1102, reflected radar signals (e.g., the radar response signals RR) that are received from a radar system (e.g., the second imaging system 14) corresponding to backscattered radar signals (e.g., backscattered radar signals RBS) reflected from a target area (e.g., the target area 11), the reflected radar signals being corrected based on at least a portion of reflected lidar signals (e.g., the lidar response signals LR) that are received from a lidar system (e.g., the first imaging system 12) corresponding to backscattered lidar signals (e.g., backscattered lidar signals LBS) reflected from the target area. At element 1104, a corrected radar image (e.g., corrected image 17) is generated based on the corrected reflected radar signals (e.g., by spectrum corrector 42). At element 1106, a lidar image (e.g., lidar image 48) is generated based on the reflected lidar signals (e.g., lidar response signals LR). At element 1108, the corrected radar image (e.g., corrected image 17) is fused (e.g., by image fuser 44) with the lidar image (e.g., lidar image 48) to generate a fused image (e.g., fused image 46).

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope described herein, including the appended claims.

What is claimed is:

1. An imaging system, comprising:
    a first imaging system configured to provide first signals to a target area and to receive first reflected signals;
    a second imaging system configured to provide second signals to the target area and to receive second reflected signals, the first and second signals having separate frequency bands; and
    a processor configured to correct the backscattering coefficient values of the first reflected signals based on at least a portion of the second reflected signals, and to generate an image based on the corrected first reflected signals.

2. The imaging system of claim 1, wherein the image is a first image, and wherein the processor is further configured to generate a second image based on the second reflected signals and to generate a fused image based on the first image and the second image.

3. The imaging system of claim 1, wherein the processor is configured to correct the backscattering coefficient values of the first reflected signals based on slant range vectors derived from the second reflected signals.

4. The imaging system of claim 3, wherein the processor is further configured to correct the first reflected signals for at least one of a gain of the first imaging system, areas of resolution cells associated with the slant range vectors, and a variation in the slant range vectors.

5. The imaging system of claim 3, wherein the slant range vectors correspond to scattering centers of a footprint of the first imaging system that contribute to the first reflected signals.

6. The imaging system of claim 1, wherein the processor is further configured to correct the first reflected signals based on applying a spectral transform to the first reflected signals to determine a post-mixer power spectrum of the first reflected signals, and based on correcting the post-mixer power spectrum based on slant range values derived from the portion of the second reflected signals.

7. The imaging system of claim 6, wherein the processor is further configured to correct the post-mixer power spectrum based on mapping slant range vectors of the second reflected signals into the post-mixer spectrum, based on determining a correction factor associated with each of the slant range vectors, and based on correcting the post-mixer power spectrum based on the correction factors.

8. The imaging system of claim 7, wherein the processor is further configured to generate the image based on corrected backscattering coefficient values that are determined from the corrected post-mixer power spectrum.

9. The imaging system of claim 1, wherein the second imaging system comprises a plurality of aperture elements configured in a geometry that is approximately equivalent to a geometry of a plurality of aperture elements of the first imaging system.

10. The imaging system of claim 1, wherein the first imaging system and the second imaging system are separated a predetermined distance measured in a down-track direction, and wherein the predetermined distance contributes to a lag-time for the processor to map the second reflected signals into the first reflected signals to correct the first reflected signals.

11. The imaging system of claim 10, further comprising a common housing comprising the first imaging system and the second imaging system.

12. The imaging system of claim 1, wherein the first imaging system is a radar system and wherein the second imaging system is a lidar system.

13. A non-transitory computer-readable storage medium storing instructions executable by an associated processor to perform a method for imaging, the method comprising:
    correcting reflected radar signals that are received from a radar system corresponding to backscattered radar signals reflected from a target area, the reflected radar signals being corrected based on at least a portion of reflected lidar signals that are received from a lidar system corresponding to backscattered lidar signals reflected from the target area;
    generating a corrected radar image based on the corrected reflected radar signals;
    generating a lidar image based on the reflected lidar signals; and
    fusing the corrected radar image with the lidar image to generate a fused image.

14. The non-transitory computer-readable storage medium of claim 13, wherein the correcting the reflected radar signals further comprises correcting backscattering coefficient values of the reflected radar signal based on slant range vectors of the reflected lidar signals.

15. The non-transitory computer-readable storage medium of claim 13, wherein the correcting the reflected radar signals further comprises: applying a spectral transform to the radar response signals to determine a post-mixer power spectrum of the reflected radar signals; and correcting the post-mixer power spectrum based on slant range values derived from the portion of the reflected lidar signals.

16. The non-transitory computer-readable storage medium of claim 13, wherein the correcting the post-mixer power spectrum further comprises: mapping slant range vectors of the reflected lidar signals into the post-mixer spectrum; determining a correction factor associated with each of the slant range vectors; and correcting the post-mixer power spectrum based on the correction factors.

17. The non-transitory computer-readable storage medium of claim 16, wherein the generating the corrected radar image further comprises: determining corrected backscattering coefficient values from the corrected post-mixer power spectrum; and generating the corrected radar image based on the corrected backscattering coefficient values.

18. A imaging device, comprising:
    a housing comprising a radar device and a lidar device separated by a predetermined distance,
    wherein the radar device is configured to receive reflected radar signals from a target area, and
    wherein the lidar device is configured to receive reflected lidar response signals from the target area; and a processor configured to correct the reflected radar signals based on at least a portion of the reflected lidar signals and a lag-time to map the reflected lidar signals to the reflected radar signals based on the predetermined distance, and to generate a corrected radar image based on the corrected reflected radar signals.

19. The imaging device of claim 18, wherein the processor is further configured to generate a lidar image based on the reflected lidar signals, and to generate a fused image based on the corrected radar image and the lidar image.

20. The imaging device of claim 18, wherein the radar device comprises an aperture having a first geometric shape, and wherein the lidar device comprises a plurality of lidar elements arranged in a second geometric shape, wherein the first geometric shape and the second geometric shape are approximately equivalent.

* * * * *